United States Patent Office 3,308,103
Patented Mar. 7, 1967

3,308,103
SYNERGISTIC ACCELERATOR COMBINATIONS FOR ETHYLENE-PROPYLENE TERPOLYMERS
Aubert Y. Coran, Charleston, and Eiichi Morita, St. Albans, W. Va., assignors to Monsanto Company, St. Louis, Mo., a corporation of Delaware
No Drawing. Filed Oct. 30, 1964, Ser. No. 407,905
6 Claims. (Cl. 260—79.5)

The invention relates to accelerating the vulcanization of ethylene-propylene terpolymers, hereinafter called terpolymers. More particularly, the invention relates to accelerating the vulcanization of terpolymers with synergistic combinations of accelerators and to the resulting compositions.

Ethylene-propylene terpolymer is the well recognized and commonly employed name applied to the polymerized product from a polymerization of ethylene, propylene and a small quantity of a diene. Amberg discusses the dienes which have been used with ethylene and propylene in Vulcanization of Elastomers 324, 325 (Alliger and Sjothum ed. 1963). Amberg states: "Good results have been obtained with compounds which have one internal and one terminal double bond. Dicyclopentadiene is one of the preferred dienes. 2-methylene-norbornene and 11-ethyl-1,11-tridecadiene are examples of other monomers which react satisfactorily." 1,4-hexadiene and cyclooctadiene are also used as the diene monomer of the terpolymer.

An object of the invention is to provide improved vulcanized terpolymer products.

A further object of the invention is to provide synergistic combinations of additives which are highly effective accelerators for the vulcanization of terpolymers at curing temperatures.

A further object of the invention is to provide for terpolymers synergistic accelerator combinations which do not cause surface bloom. A further object of the invention is to provide an improved, economical accelerator for terpolymers.

A number of curing systems for terpolymers utilizing as accelerators various combinations of thiuram mono, di or tetra sulfides or metal salts of a dithiocarbamic acid and a thiazole are reported. However, bloom generally appears on the surface of the terpolymer when one of these sulfides or metal salts is used in the combination. Also, thiuram sulfides and metal salts of dithiocarbamic acid are expensive additives when compared with the more economical additives of this invention.

We have found that the combination of a zinc phosphorodithioate and a thiazole accelerator achieves excellent syngeristic effects when used to accelerate the vulcanization of terpolymers. Romieux in U.S. Patent 1,867,631 reports the accelerator properties of disubstituted phosphorodithioates for the vulcanization of rubber. This work is followed by Anderson's in U.S. Patent 2,879,243 which reports thiazole accelerators activated by alkali dialkyl phosphorodithioates as accelerator combinations for the vulcanization of rubber articles formed from latex. By combining a zinc phosphorodithioate and a thiazole accelerator, we have found that the effectiveness of each accelerator is enhanced when used to accelerate the vulcanization of terpolymers. The bloom on the surface of the terpolymer which appears when other accelerators are used is eliminated by using the zinc phosphorodithioate and thiazole accelerator combination of our invention. Also, our invention provides an economical and improved accelerator combination for the vulcanization of terpolymers. A Technical Report on NORDEL Hydrocarbon Rubber by the E. I. du Pont de Nemours and Company (April 1964) illustrates typical formulations for ethylene-propylene terpolymers. Page 18 of the Du Pont report illustrates formulations containing mineral fillers.

Typical examples of zinc phosphorodithioates which are used in the practice of this invention include the following:

Zinc O,O-dimethyl phosphorodithioate
Zinc O,O-diethyl phosphorodithioate
Zinc O,O-bis(9,10-dichloroctadecyl) phosphorodithioate
Zinc O,O-bis(1,3-dimethylbutyl) phosphorodithioate
Zinc O,O-bis(2-ethylhexyl) phosphorodithioate
Zinc O,O-bis(4-methylpentyl) phosphorodithioate
Zinc O,O-diisopropyl phosphorodithioate
Zinc O,O-ditridecyl phosphorodithioate
Zinc O,O-diamyl phosphorodithioate
Zinc O,O-dihexyl phosphorodithioate
Zinc O,O-dilauryl phosphorodithioate
Zinc O,O-dioctadecyl phosphorodithioate
Zinc O,O-dioctyl phosphorodithioate Typical examples of thiazole accelerators which are used in the practice of this invention include the following:

2-mercaptobenzothiazole
Sodium 2-mercaptobenzothiazole
Zinc 2-mercaptobenzothiazole
2,2'-dithiobisbenzothiazole
2-(morpholinothio)-benzothiazole
2-benzothiazolyl 1-hexamethyleniminecarbodithioate
2-benzothiazolyl-thiolbenzoate
1,3-bis(2-benzothiazolylmercaptomethyl) urea
2-(2,4-dinitrophenylthio) benzothiazole
S(2-benzothiazolyl) N,N-diethyl dithiocarbamate
N-cyclohexylbenzothiazole-2-sulfenamide
N-tert-butylbenzothiazole-2-sulfenamide Other accelerators can be added to the combinations of this invention. A thiuram monosulfide is an example of a third component which can be added. If the concentration of the thiuram monosulfide is less than 0.5 part by weight, surface bloom problems are not experienced.

The vulcanization procedure and evaluation of the terpolymer are described in detail below. Evaluation of the terpolymer vulcanization accelerator combinations is carried out in a base formulation comprising

| | Parts by wt. |
|---|---|
| Ethylene-propylene terpolymer | 100 |
| Zinc oxide | 5 |
| Carbon black | 80 |
| Aromatic processing oil | 40 |
| Sulfur | 1.5 |

The terpolymer used in this base formulation is known commercially as "Nordel 1040."

The seven samples of the accelerators listed alphabetically are illustrative of accelerators tested with the base formulations described.

| | Parts by wt. |
|---|---|
| A—Zinc O,O - bis(1,3 - dimethylbutyl)phosphorodithioate | 3.0 |
| B—Zinc O,O - bis(1,3 - dimethylbutyl)phosphorodithioate | 2.0 |
|     2-mercaptobenzothiazole | 1.0 |
| C—2-mercaptobenzothiazole | 3.0 |
| D—Zinc O,O - bis(1,3 - dimethylbutyl)phosphorodithioate | 2.0 |
|     2 - benzothiazolyl 1 - hexamethyleniminecarbodithioate | 1.0 |
| E—2 - benzothiazolyl 1 - hexamethyleniminecarbodithioate | 3.0 |
| F—Zinc O,O - bis(1,3 - dimethylbutyl)phosphorodithioate | 2.0 |
|     N-tert-butylbenzothiazole-2-sulfenamide | 1.0 |
| G—N-tert-butylbenzothiazole-2-sulfenamide | 3.0 |

The base formulation is evaluated with each sample of accelerator listed by heating each stock to 135° C. in a Mooney plastometer. The time in minutes required for the viscosity of the stock to increase 5 units above the minimum viscosity is determined. These values are commonly known as "Mooney Scorch Time" ($t_5$). Additionally, the time required in minutes for the viscosity of the stock to rise from 5 units above the minimum to 35 units above the minimum at 135° C. is recorded in Table I as the Cure Rate Factor ($t_{35-5}$). The Mooney plastometer data for the stocks vulcanized at 135° C. are recorded in Table I. The base formulation is constant for each sample of accelerator.

TABLE I

| Accelerator | Mooney Scorch Time, Minutes $t_5$ | Cure Rate Factor, Minutes $t_{35-5}$ |
|---|---|---|
| A | 11.5 | 8.6 |
| B | 6.2 | 2.8 |
| C | 3.5 | 91.0 |
| A | 11.5 | 8.6 |
| D | 11.1 | 5.4 |
| E | 15.7 | 7.9 |
| A | 11.5 | 8.6 |
| F | 14.5 | 3.7 |
| G | 35.5 | 15.9 |

The cure rates of the stocks including the zinc phosphorodithioate and thiazole accelerator combinations (B, D and F) illustrate the enhanced effectiveness of these accelerator combinations. Each stock containing an accelerator combination shows a faster cure rate than stocks containing only single components of the combinations. The Mooney Scorch Time is a measure of processing time available before vulcanization begins. Accelerators such as mercaptobenzothiazole are considered scorchy accelerators because of the minimal time available (3.5 minutes) for processing when this compound is used to accelerate the vulcanization of a terpolymer. However, when mercaptobenzothiazole is used in combination with zinc O,O-bis(1,3-dimethylbutyl) phosphorodithioate, the scorch time for the stock containing the combination is increased almost two-fold when this time is compared with mercaptobenzothiazole alone in a stock.

Stress-strain data from stock cures at 160° C. are recorded in Table II. The base formulation is constant for each sample of accelerator.

TABLE II

| Accelerator | Minutes | Modulus of Elasticity at 300% Elongation, lbs./in.² | Tensile Strength at Break, lbs./in.² | Ultimate Elongation, Percent |
|---|---|---|---|---|
| A | 20 | 330 | 1,820 | 1,050 |
|  | 40 | 500 | 2,100 | 870 |
| B | 20 | 1,000 | 2,600 | 600 |
|  | 40 | 1,340 | 2,400 | 500 |
| C | 20 | 60 | 230+ | 1,200+ |
|  | 100 | 700 | 2,220 | 770 |
| A | 20 | 330 | 1,820 | 1,050 |
|  | 40 | 500 | 2,100 | 870 |
| D | 20 | 940 | 2,320 | 600 |
|  | 30 | 1,130 | 2,350 | 540 |
| E | 20 | 1,090 | 2,470 | 600 |
|  | 40 | 1,410 | 2,340 | 490 |
| A | 20 | 330 | 1,820 | 1,050 |
|  | 40 | 500 | 2,100 | 870 |
| F | 20 | 950 | 2,550 | 660 |
|  | 40 | 1,300 | 2,590 | 550 |
| G | 20 | 440 | 2,050 | 940 |
|  | 60 | 1,150 | 2,560 | 600 |

The moduli of elasticity of stocks containing zinc O,O-bis(1,3-dimethylbutyl) phosphorodithioate combined with mercaptobenzothiazole (B) or N-tert-butylbenzothiazole-2-sulfenamide (F) illustrate the enhanced effectiveness of the accelerator combinations when compared with the moduli of elasticity of stocks containing only single components of the combinations. The moduli of the stocks containing these combinations are greatly increased. The stock containing an accelerator combination of zinc O,O-bis(1,3-dimethylbutyl) phosphorodithioate and 2-benzothiazolyl 1-hexamethyleniminecarbodithioate (D) shows a superior product modulus over a stock containing zinc O,O-bis(1,3-dimethylbutyl) phosphorodithioate alone.

A combination of zinc O,O-bis(1,3-dimethylbutyl) phosphorodithioate and mercaptobenzothiazole (B) shows greater tensile strength than either of the components of the combination.

Analogous results are obtained in terpolymer vulcanization when the parts by weight ratio of zinc phosphorodithioate to thiazole accelerator or thiazole accelerator to zinc phosphorodithioate is varied as much as 10 to 1.

It is intended to cover all changes and modifications of the examples of the invention herein chosen for purposes of disclosure which do not constitute departures from the spirit and scope of the invention.

We claim:
1. A method of vulcanizing sulfur-vulcanizable ethylene-propylene diene terpolymer which comprises mixing the terpolymer with a sulfur-containing vulcanizing agent, an accelerating amount of a synergistic combination of a thiazole accelerator and a zinc phosphorodithioate of the formula

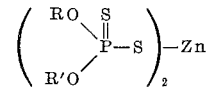

where R and R' are organic radicals containing less than 19 carbon atoms selected from the group consisting of alkyl alicyclic, alkenyl and aralkyl radicals and heating the mixture at vulcanizing temperature.

2. A method of vulcanizing sulfur-vulcanizable ethylene-propylene diene terpolymer which comprises mixing the terpolymer with a sulfur-containing vulcanizing agent and an accelerating amount of a synergistic combination of zinc O,O-bis(1,3-dimethylbutyl) phosphorodithioate and mercaptobenzothiazole and heating the mixture at vulcanizing temperature.

3. A method of vulcanizing sulfur-vulcanizable ethylene-propylene diene terpolymer which comprises mixing the terpolymer with a sulfur-containing vulcanizing agent and an accelerating amount of a synergistic combination of zinc O,O-bis(1,3-dimethylbutyl) phosphorodithioate and 2-benzo-thiazolyl 1-hexamethyleniminecarbodithioate and heating the mixture at vulcanizing temperature.

4. A method of vulcanizing sulfur-vulcanizable ethylene-propylene diene terpolymer which comprises mixing the terpolymer with a sulfur-containing vulcanizing agent and an accelerating amount of a synergistic combination of zinc O,O-bis(1,3-dimethylbutyl) phosphorodithioate and N-tert-butylbenzothiazole-2-sulfenamide and heating the mixture at vulcanizing temperature.

5. A method of vulcanizing sulfur-vulcanizable ethylene-propylene diene terpolymer which comprises mixing the terpolymer with a sulfur-containing vulcanizing agent, an accelerating amount of a synergistic combination of a thiazole accelerator, and a zinc phosphorodithioate of the formula

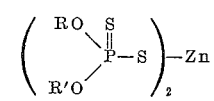

where R and R' are n-alkyl of 1–8 carbon atoms and heating the mixture at vulcanizing temperature.

6. The process of claim 5 where there is also mixed with the terpolymer an accelerating amount of a thiuram monosulfide.

No references cited.

JOSEPH L. SCHOFER, *Primary Examiner.*

D. K. DENENBERG, *Assistant Examiner.*